US008040636B2

(12) United States Patent
Choi et al.

(10) Patent No.: US 8,040,636 B2
(45) Date of Patent: Oct. 18, 2011

(54) HARD DISK DRIVE

(75) Inventors: Byoung Gyou Choi, Suwon-si (KR); Jeong Il Chun, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 463 days.

(21) Appl. No.: 12/357,435

(22) Filed: Jan. 22, 2009

(65) Prior Publication Data

US 2009/0185313 A1    Jul. 23, 2009

(30) Foreign Application Priority Data

Jan. 22, 2008   (KR) .................. 10-2008-0006803

(51) Int. Cl.
*G11B 21/22* (2006.01)
(52) U.S. Cl. .................................. 360/256.2; 360/256
(58) Field of Classification Search ............... 360/256.2, 360/256.3, 264.2, 264.7, 265.7, 256
See application file for complete search history.

(56) References Cited

U.S. PATENT DOCUMENTS

| 5,675,455 | A | 10/1997 | Matsumoto | |
| 6,765,763 | B2 * | 7/2004 | SeeToh et al. | 360/264.2 |
| 6,914,753 | B2 * | 7/2005 | Takashima | 360/256.2 |
| 7,414,815 | B2 * | 8/2008 | Fujimoto et al. | 360/264.7 |
| 7,616,406 | B2 * | 11/2009 | Fujimoto et al. | 360/256.2 |

FOREIGN PATENT DOCUMENTS

| JP | 08297933 | | 11/1996 |
| JP | 2001014815 | | 1/2001 |
| KR | 100263043 | B1 | 5/2000 |
| KR | 100660897 | B1 | 12/2006 |

* cited by examiner

*Primary Examiner* — Gene N Auduong
(74) *Attorney, Agent, or Firm* — Volentine & Whitt, PLLC

(57) ABSTRACT

A hard disk drive includes a magnetic retractor situated at and integrated with the pivot holder of a head stack assembly. An actuator arm of the head stack assembly supports a read/write head, a bobbin supports a voice coil of a voice coil motor, and the actuator arm and bobbin extend in generally opposite directions from pivot holder. The pivot holder receives a pivot such that the actuator arm can be rotated about an axis of the pivot. The voice coil motor also includes a pair of magnets (permanent magnet). The retractor interacts with the magnets of the voice coil motor to generate a retract force which urges the actuator arm to a position at which the read/write head is parked. By providing the retractor on the pivot holder, the retract force will always be close to that specified according to the design of the drive. Therefore, the read/write head is not only prevented from being unintentionally released while it is parked, but is also assuredly moved towards a target position over the disk when power is supplied to the voice coil motor to initiate a read/write operation.

18 Claims, 7 Drawing Sheets

HARD DISK DRIVE

BACKGROUND OF THE INVENTION

1. Field of the Invention

The present invention relates to a hard disk drive (HDD). More particularly, the present invention relates to means for controlling movement of a head stack assembly which includes the read/write head of the HDD.

2. Description of Related Art

Hard disk drives (HDDs) are devices which can quickly access large amounts of data. Thus, HDDs have been widely used for a long time as auxiliary memory devices of computers. In general, an HDD includes a disk on which data is/can be stored, and a read/write head that records data on the disk or reproduces data stored on the disk. In this respect, units of the data, in the form of bits, are magnetically recorded on or reproduces from tracks of the disk.

The data storage disks for use in HDDs are continuously being improved to increase the TPI (tracks per inch) and BPI (bits per inch). These and other improvements have led to more compact HDDs and have thus expanded the number of electronic products which employ an HDD as a memory device. In particular, compact HDDs are now employed by portable electronic products such as laptops, personal digital assistants (PDAs), and mobile phones. The disk of a typical compact HDD has a diameter of 2.5 inches. However, disks as small as 0.8 inches in diameter, i.e., whose size is similar to that of a coin, are been actively developed for use in mobile phones or MP3 players.

FIG. 1 is a plan view of a conventional compact HDD 101. Referring to FIG. 1, the HDD 101 includes a disk pack 110 having a disk 111, a head stack assembly (HSA) 140 having a read/write head 141 for recording data on the disk 111 and reproducing data from the disk 111, a voice coil motor (VCM) for driving the HSA 140, a latch 170 for preventing the read/write head 141 from moving across the disk 111 when the HDD is in a non-operating state, a ramp 180 on which the read/write head 141 of the HSA 140 is parked while the HDD is in the non-operating state, and a 160 to which the above-mentioned elements are mounted, and a cover (not shown).

In addition to the read/write head 141, the HSA 140 includes an actuator arm 143 having a distal end at which the read/write head 141 is supported, a pivot 142 in the form of a shaft fixed relative to the base 160, and a pivot holder 144 supported by the pivot 142 so as to be rotatable about the central longitudinal axis of the pivot 142. The actuator arm 143 is coupled at a proximate end thereof to the pivot holder 144 so as to be rotatable therewith. Therefore, the read/write head 141 can be moved across the disk 111 by rotating the actuator arm 143 about (the central longitudinal axis of) the pivot 142.

The HSA 140 also includes a bobbin 145 integral with and extending from the proximate end of the actuator arm 143, i.e., from the side of the pivot holder 144 opposite that from which the actuator arm 143 generally extends. A voice coil 146 of the VCM 130 is wound around the bobbin 145, and a VCM block of the VCM 130 is installed on the base 160. The VCM block includes a magnet 132 that is juxtaposed with the voice coil 146. The actuator arm 143 is rotated by an electromagnetic force generated between the voice coil 146 and the magnet 132 when current flows through the voice coil 146. Bobbin pins provided on the pivot holder 144 to connect a flexible printed circuit board (FPCB) to the voice coil 146 winding along the bobbin 145. The FPCB is, in turn, electrically connected to a PCB (not shown) disposed below the base 160 and configured to control the VCM.

According to the functions described above, the read/write head 141, supported at the distal end of the actuator arm 143, is positioned by the VCM over a track of the disk 111 to record data on the disk 111 or reproduce data from the disk 111. However, before this happens, the bobbin 145 must be released by the latch 170.

That is, the latch 170 hooks onto the bobbin 145 when the HDD is in its non-operating state. To this end, a retract pin 148 is disposed on a protruding portion 147 of the bobbin 145 that is hooked by the latch 170. The retract pin 148 is of a magnetic material and acts with the magnet 132 of the VCM 130 to generate a force which urges the bobbin 145 to rotate in direction A in FIG. 1, i.e., toward the latch 170. In this state, as mentioned above, the distal end of the actuator arm 143 rests on the ramp 180, and the read/write head 141 is said to be "parked" on the ramp 180. The engagement between the bobbin 145 and the latch 170 prevents the read/write head 141 from moving away from the ramp 180 and onto the disk 111 even when an external shock is applied to the HDD. Thus, the latch 170 serves to prevent the read/write head 141 and/or the recording surface of the disk 111 from being damaged when the HDD is in its non-operating state.

In the conventional HDD 101 as described above, the function of the latch 170 may be adversely affected due to warping of the bobbin 145 and/or if the base 160 is not level relative to the HSA 140. The bobbin 145 is likely to warp because the retract pin 148 is fixed the very end of the bobbin 145, i.e., because the retract pin 148 which is attracted towards the magnet 132 is located relatively far from the fixed axis (pivot 142) of the HSA 140. Such factors (warpage of the bobbin, etc.) can cause the actual distance between the bobbin 145 and the magnet 132 of the VCM to deviate from the distance specified according to the design of the HDD. In this case, a force that is greater than or less than the predetermined (design) force specified for the latch 170 to operate properly may be generated. For instance, the read/write head 141 may not be moved toward the disk 111, at the start of a read/write operation, when the actual force generated between the retract pin 148 and the magnet 132 is greater than the predetermined force.

On the other hand, the read/write head 141 can be moved onto the disk 111 by an external shock if the actual force generated between the retract pin 148 of the latch and the magnet 132 of the VCM is less than the predetermined force. Furthermore, the magnetic field generated between the magnet 132 and the retract pin 148 must not affect a magnetic region of the disk 111, which is of a concern because the protruding portion 147 of the bobbin 145 to which the retract pin 148 is mounted is swung toward the disk 111 when the read/write head 141 is being parked. This concern associated with the provision of the retract pin 148 imposes limits on the size of the magnet 132 of the VCM. Limiting the size of the magnet 132 also limits the electromagnetic force which can be generated by the VCM for rotating the actuator arm 143.

SUMMARY OF THE INVENTION

An object of the present invention is to provide an HDD which can generate a retract force that remains substantially the same as that specified by design. Accordingly, a more specific object of the present invention is to provide an HDD which not only can prevent its read/write head from being unintentionally released while it is parked and the HDD is in a non-operating state, but which also ensures that the read/write head will move smoothly toward and across a disk when the HDD is set to operate.

Another object of the present invention is to provide an HDD having a voice coil motor that can produce a large electromagnetic force for its size without adversely affecting the magnetic field of the disk.

Still another object of the present invention is to reduce a cost associated with the manufacturing of an HDD.

According to an aspect of the present invention, there is provided a hard disk drive in which a magnetic retractor is situated at and integrated with a pivot holder of the head stack assembly of the drive. An actuator arm of the head stack assembly supports a read/write head, a bobbin supports a voice coil of a voice coil motor, and the actuator arm and bobbin extend in generally opposite directions from pivot holder. The pivot holder receives a pivot such that the actuator arm can be rotated about an axis of the pivot. The voice coil motor also includes a pair of magnets (permanent magnet). The retractor interacts with the magnets of the voice coil motor to generate a retract force which urges the actuator arm to a position at which the read/write head is parked. Preferably, the retractor is of steel or stainless steel (SUS).

The hard disk drive also has a latch including a latch arm supported on the base so as to be freely rotatable under its own inertia about an axis. The latch arm has a hook at a tip end of the latch arm. On the other hand, the bobbin has a protrusion that defines a notch which is configured to receive the hook of the latch arm. In this way, the bobbin is hooked by the latch arm when a shock is applied to the HDD so that the read/write head can remain parked. The latch may also have a magnetic latch pin at a rear end of the latch arm. The latch pin interacts with the magnet of the voice coil to generate a force which biases the latch arm in one direction (of rotation) which allows the bobbin to be released from the latch arm so that the read/write head can be moved from its parked position to start a read/write operation.

According to another aspect of the present invention, the retractor serves as a bobbin pin that electrically connects the voice coil and a flexible printed circuit board (FPCB) which extends atop the base.

According to another aspect of the invention, there is provided a hard disk drive having a base, a spindle motor mounted to the base and a disk supported by the spindle motor, and head stack assembly including a read/write head for read/writing information from/onto the disk, and in which a magnetic retractor is not only integrated with a pivot holder of the head stack assembly of the drive, but the retractor is disposed at a side of the pivot holder remote from the disk.

BRIEF DESCRIPTION OF THE DRAWINGS

These and/or other objects, aspects and advantages of the present invention will become more apparent and more readily appreciated from the following detailed description of the invention, made in conjunction with the accompanying drawings of which.

DETAILED DESCRIPTION OF THE PREFERRED EMBODIMENTS

Figure 1:
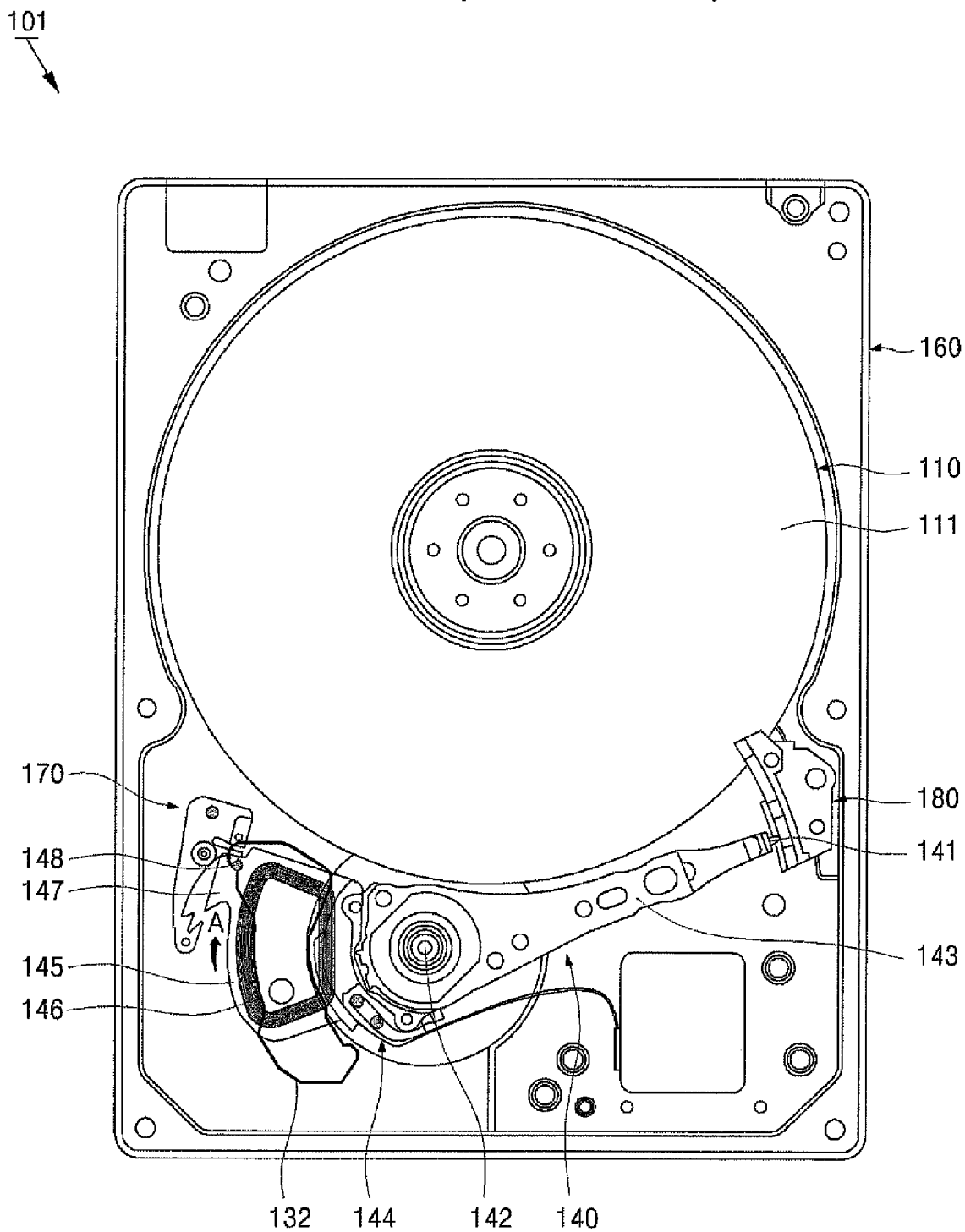
FIG. 1 is a plan view of a conventional HDD.

The present invention will now be described in detail with reference to FIGS. 2-6. Like reference numerals are used to designate like elements throughout the drawings.

An HDD 1 according to the present invention includes a disk pack 10 having at least one disk 11 (i.e., one or a plurality of vertically arranged disks), a printed circuit board assembly (PCBA) 20, a head stack assembly (HSA) 40 having a read/write head 41 supported at one end portion thereof and a bobbin 45 provided at the other end portion thereof, a voice coil motor (VCM) 30 for driving the HSA 40, a latch 70 for preventing the read/write head 41 from moving across the disk 11 when the HDD is in a non-operating state, a ramp 80 on which the read/write head 41 of the HSA 40 is parked while the HDD is in the non-operating state, a base 60 to which the above-mentioned components are mounted, and a cover 50 coupled to the base 60 to protect components installed on the base.

In addition to the at least one disk 11, the disk pack 10 includes a shaft 13 having a central axis about which the disk 11 is rotated, a spindle motor hub (not shown) centered on the shaft 13 and supporting the disk 11, a spindle motor (not shown) that rotates the spindle motor hub, a clamp 14 coupled to the upper portion of the spindle motor hub, and clamp screws 15 securing the clamp 14 to the spindle motor hub such that the disk 11 is clamped to the spindle motor hub by the clamp 14.

The PCBA 20 includes a printed circuit board (PCB, not shown) coupled to a rear surface of the base 60, a flexible printed circuit board (FPCB) 22 installed on an upper surface of the base 60 adjacent to the HSA 40 and electrically connecting the HSA 40 and the PCB, and a PCB connector 21 provided at a side of the PCB. A plurality of chips (not shown) and circuits (not shown) for controlling the disk pack 10, the HSA 40, and the VCM 30 are provided on the PCB and exchange signals with external devices via the PCB connector 21.

In addition to the aforementioned read/write head 41, the HSA 40 includes an actuator arm 43 having one end at which the read/write head 41 is supported, a bobbin 45 integral with the actuator arm 43 and projecting from the other end of the actuator arm 43, a pivot 42 in the form of a shaft having a central longitudinal axis, a pivot holder 44 coupled to the actuator arm 43 and mounted to the pivot 42 such that the actuator arm 43 is rotatable about the axis of the pivot 42, and a retractor 48 of magnetic material integrated with the pivot holder 44. The bobbin 45 and the actuator arm 43 are basically provided on opposite sides of the pivot holder 44, i.e. on opposite sides of the axis about which the actuator arm 43 rotates. As mentioned above, the read/write head 41 reads information from or records information onto the disk 11. More specifically, the disk 11 has a magnetic recording surface at which data in magnetic form is/can be stored. The read/write head 41 includes a read head operable to detect a magnetic field of the disk 11 and a write head operable to magnetize the disk 11.

Figure 2:
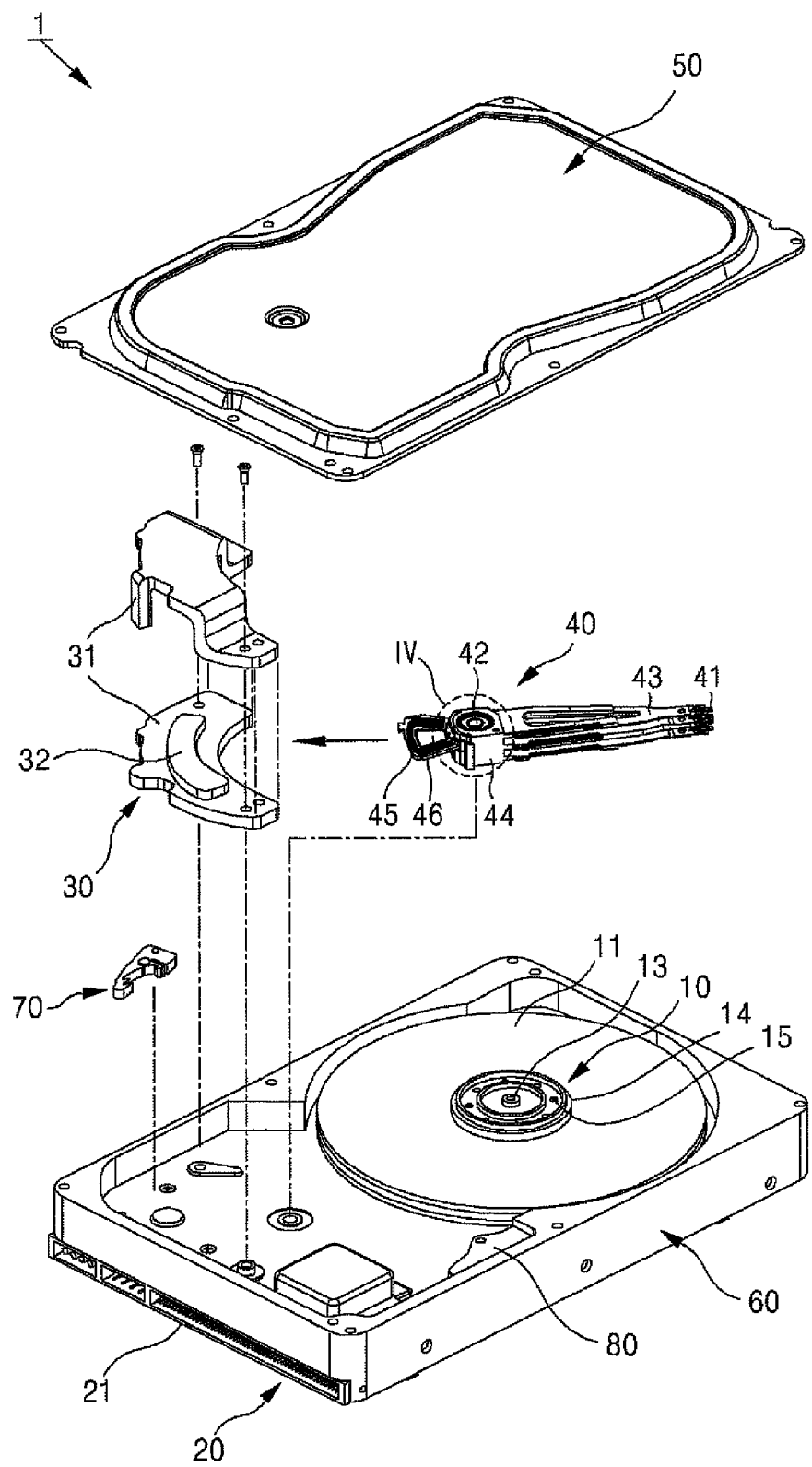
FIG. 2 is an exploded perspective view of an embodiment of an HDD according to the present invention.
Figure 3:
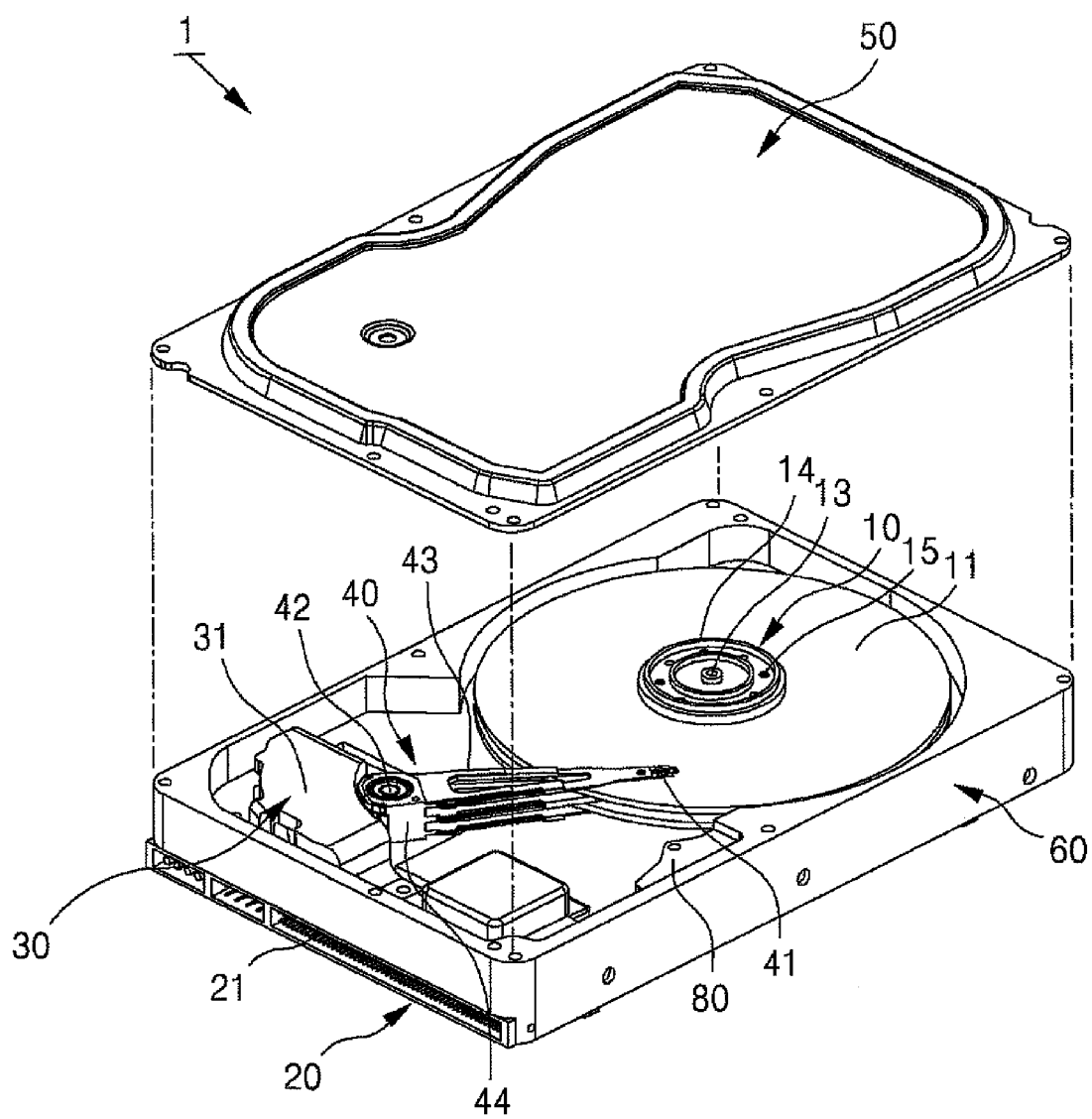
FIG. 3 is an assembled perspective view of the HDD.
Figure 4:
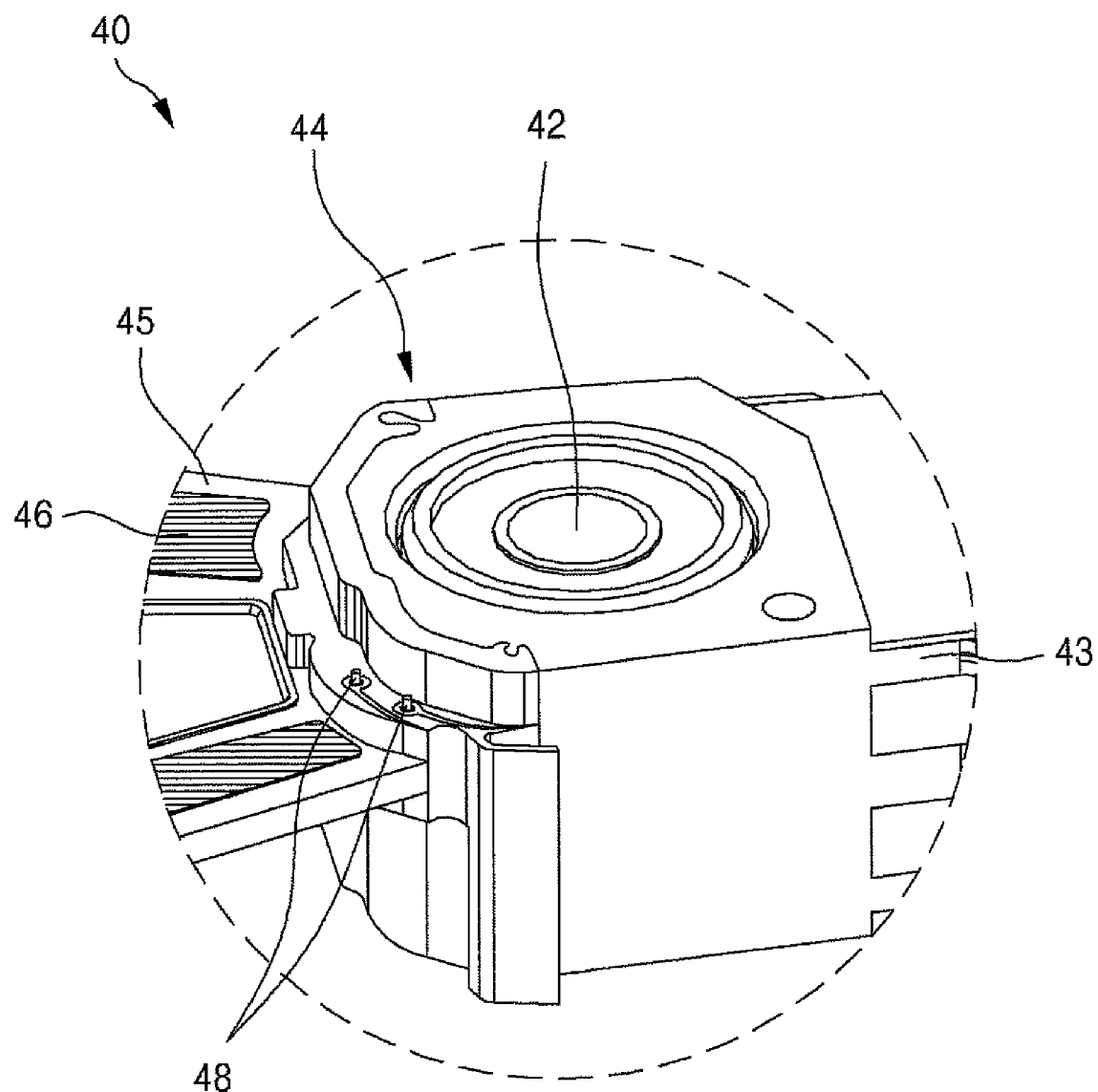
FIG. 4 is an enlarged perspective view of a portion IV of the HDD illustrated in FIG. 2, showing the structure of the pivot shaft holder.

The VCM 30 is operable to move the read/write head 41 to a desired position over the disk 11. To this end, the VCM 30 includes a VCM block 31 having a pair of magnets 32 (only a lower one of which is shown in FIG. 2) and a voice coil 46 fixed to the bobbin 45 so as to lie between the magnets 32. The VCM 30 operates according to Fleming's left hand rule. That is, when current flows in a conductive body and the conductive body is present in a magnetic field, a force is applied to the conductive body. Fleming's left hand rule shows the direction of this force on the conductive body. As mentioned above, the voice coil 46 (conductive body) is located in the magnetic field generated by the magnets 32 and thus receives a force when current is supplied to the coil 46. Accordingly, the bobbin 45 to which the voice coil 46 is fixed is rotated. Thus, the actuator arm 43 is rotated about the axis of the pivot 42 in a predetermined direction dependent on the direction in which current is supplied to the voice coil 46. The current is controlled by the circuits/chips on the PCB so that the read/write head 41 supported at the end portion of the actuator arm 43 is positioned over desired tracks of the rotating disk 11. Consequently, data can be recorded on or reproduced from the desired tracks of the disk 11.

Figure 5:
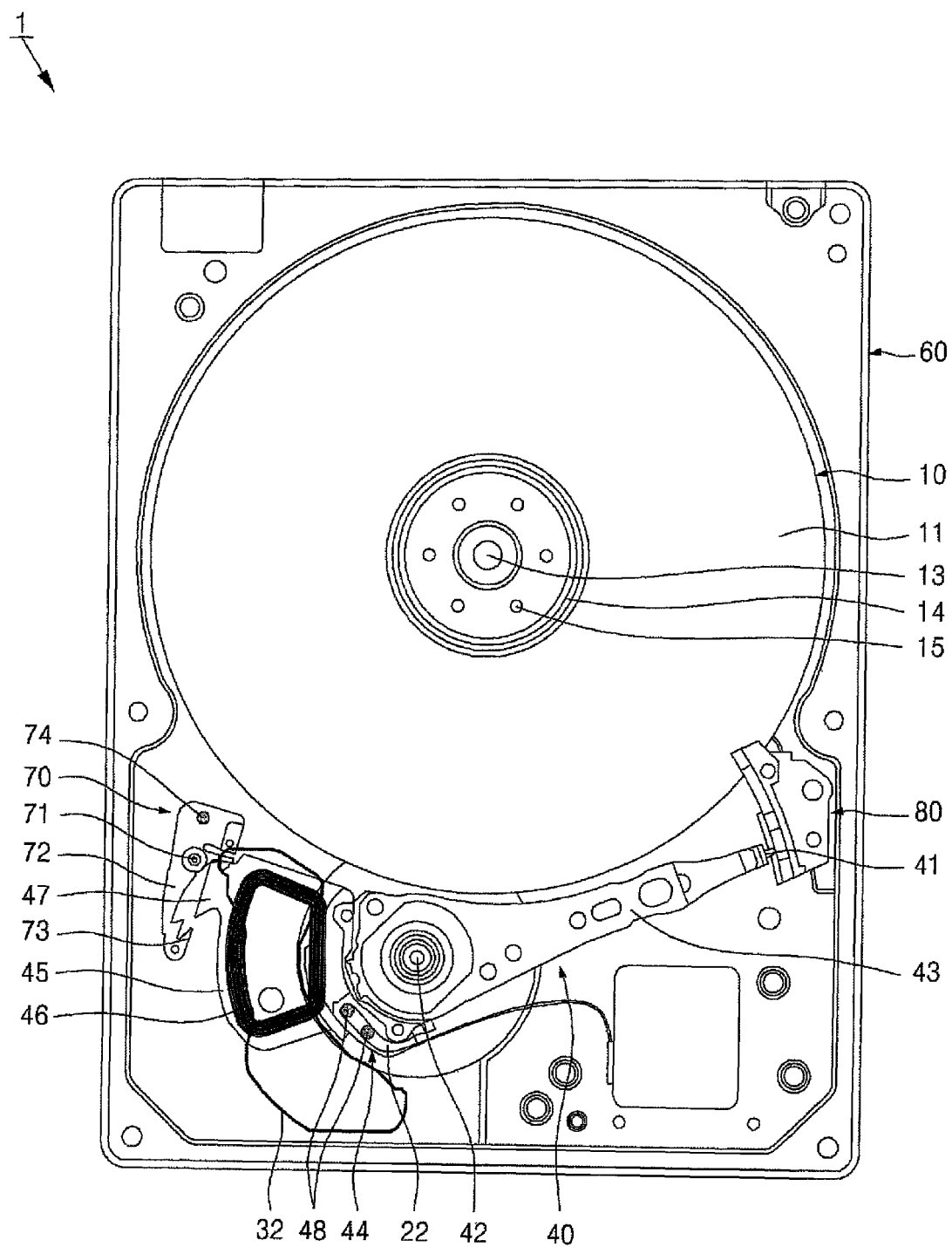
FIG. 5 is a plan view of the HDD without the cover.
Figure 6:
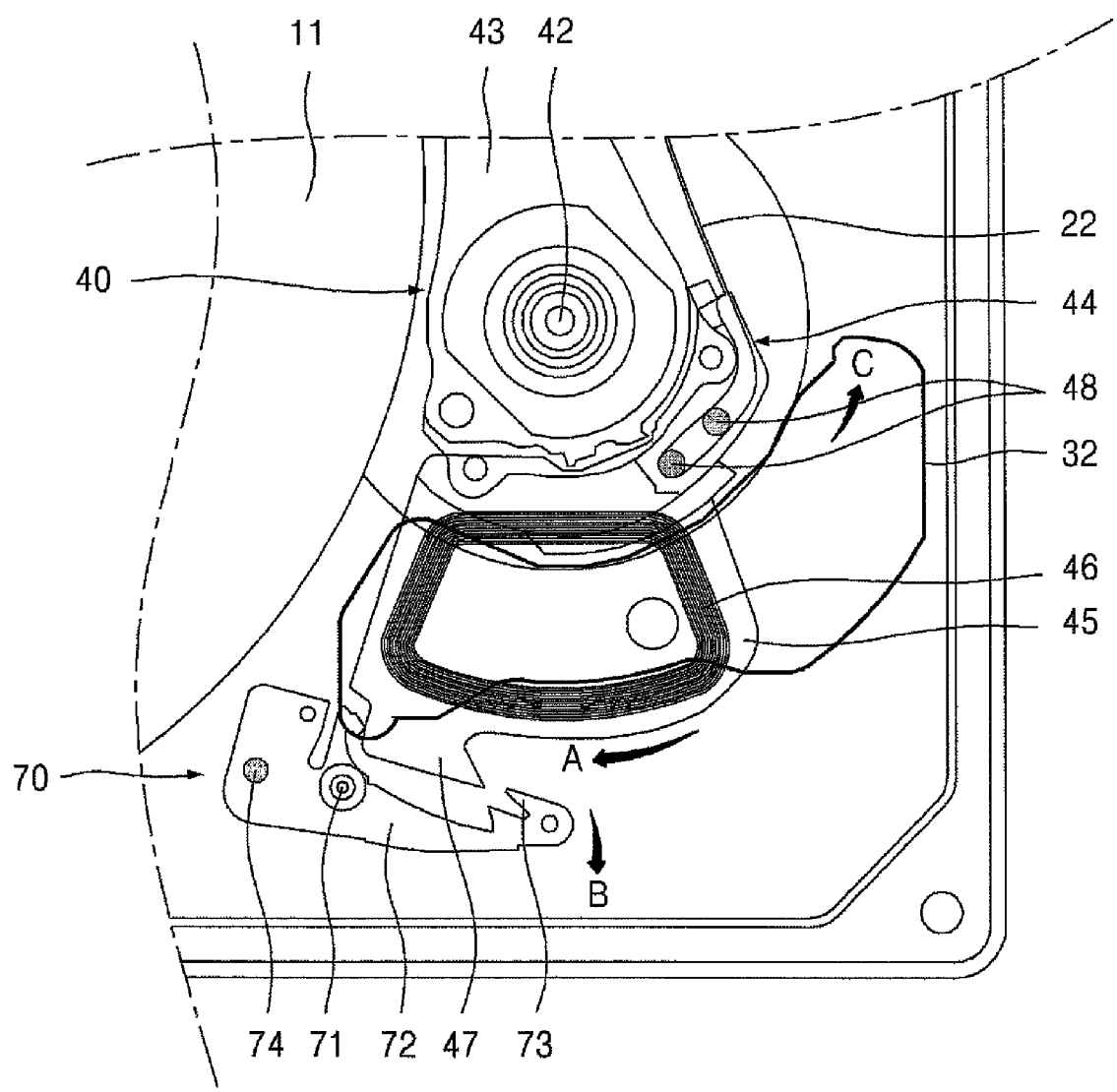
FIG. 6 is an enlarged view of a portion of the HDD illustrated in FIG. 5, for use in explaining the operation of the head stack assembly of the HDD.
Figure 7:
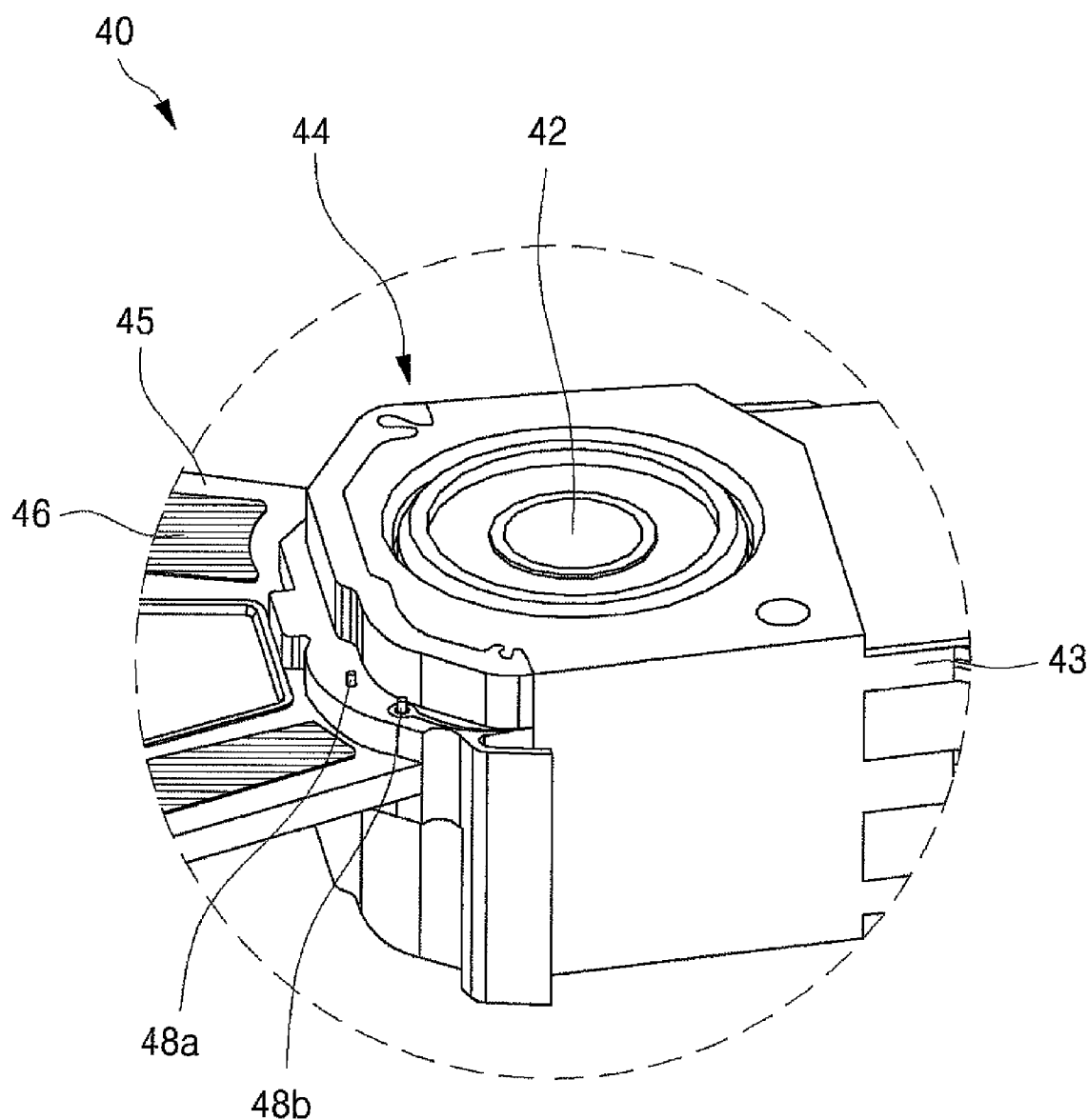
FIG. 7 is an enlarged perspective view of another embodiment of an HDD according to the present invention

The latch 70, as best shown in FIGS. 5 and 6, is configured to latch onto the bobbin 45. In this respect, the latch 70 includes a latch arm 72, and a pivot 71 in the form of a shaft fixed to the base 60. The latch arm 72 is mounted to the pivot 72 so as to be freely rotatable about a central longitudinal axis of the pivot 71. The latch arm also 72 has a hook 73 at one end thereof, and a latch pin 74 at the other end thereof. The hook 73 faces a notch defined by a protuberance 47 of the bobbin 46. The hook 73 can be received in the notch such that the latch arm 72 latches onto the bobbin 46 and hence, limits the rotation of the actuator arm 43.

The latch pin 74 is formed of a magnetic material and urges the latch arm 72 to rotate in a direction indicated by arrow B in FIG. 6. More specifically, a magnetic force of attraction is generated between the latch pin 74 and the magnets 32 of the VCM 30. Accordingly, the bobbin 45 of the HSA 40 can be released from the hook 73 of the latch arm 72 when the read/write head 41 is to be moved by the VCM 30 off of the ramp 80 and toward the disk 11 to initiate a read/write operation.

After a read/write operation is performed, the read/write head 41 is parked back on the ramp 80. In this case, the VCM 30 is controlled to rotate the actuator arm 43 in the direction indicated by arrow A in FIG. 6. At this time, the retractor 48, installed on the pivot holder 44, interacts with the magnets 32 to maintain the actuator arm 43 in position with the read/write head 41 parked.

More specifically, the retractor 48 of the present invention is disposed on the pivot holder 44, and not on the bobbin 45 as is the case of the prior art, to interact with the magnets 32. The pivot holder 44 is mounted to the pivot 42 fixed to the base 60. The pivot holder 44 does not tend to warp because the retractor 48 is not located far from the fixed axis (pivot 42) of the HSA 40. Furthermore, the retractor 48 is not affected by the levelness of the base 60. Thus, the "retract" force generated between the retractor 48 and the magnets 32 will correspond to that specified for the HDD. Specifically, the retract force will be low enough to assure that the read/write head 41 will move toward the disk 11 when a read/write operation is initiated. On the other hand, the retract force will be great enough to prevent the read/write head 41 from being prematurely released from its parked state when an external shock is applied to the HDD. Preferably, the retractor 48 is formed of a magnetic metal material, namely, steel or martensite-based stainless steel (SUS420). Such material ensures that the retract force is generated efficiently.

The retractor 48 may be spaced from the bobbin pin(s) that electrically connects the FPCB 22 to the voice coil 46. Alternatively, as shown in the figures, the retractor 48 may serve as a bobbin pin(s) connecting the FPCB 22 to the voice coil 46. Thus, in this case, a dedicated bobbin pin(s) is/are not required. Therefore, the costs otherwise associated with the manufacturing and installing of the bobbin pins can be saved.

Moreover, the magnets 32 may be larger than those in the prior art of FIG. 1. In particular, the retractor 48 is located on that side of the pivot holder 44 which is remote from the disk 11 (the sides of the pivot holder 44 being those portions on opposite sides of an imaginary line passing through the read/write head 41 and the axis of the pivot 42, i.e., dividing the HSA 40 longitudinally in half). Thus, the magnets 32 may be elongated in the direction indicated by arrow C of FIG. 6, i.e., in a direction away from the disk 11, to be close to the retractor 48 on the pivot holder 44 when the actuator arm 43 is in a position at which the read/write head 41 is parked. Therefore, the magnetic field between the magnets 32 and the retractor 48 will not influence the magnetic field of the disk 11. Thus, compared to the prior art a large amount of the electromagnetic force can be created by the interaction of the voice coil 46 and the magnets 32 to rotate the actuator arm 43.

The operational state of the HDD 1 of the present invention will now be described in both the case in which the power is on and the case in which the power is off. First, when the power is off, the HSA 40 is in a state in which the read/write head 41 is parked, i.e., one end of the HSA 40 rests on the ramp 80. At this time, the notch in the bobbin 45 provided at the other end of the HSA 40 faces the hook 73 of the latch arm 72. Accordingly, when an external shock is applied to the HDD, the latch 70 and the retract force generated by the interaction of the magnets 32 of the VCM 30 and the retractor 48 maintain the read/write head 41 in its parked state. That is, the read/write head 41 is prevented from being moved onto the disk 11 by the external shock applied to the HDD. Thus, the read/write head 41 and the disk 11 are prevented from being damaged.

When the power is subsequently turned on, current flows through the voice coil 46. As a result, the actuator arm 43 is rotated by the VCM 30 in the direction indicated by arrow C in FIG. 6, and the disk 11 is rotated. At this time, the latch arm 72 is rotated in the direction B in FIG. 6, due to the attraction of the latch pin 74 to the magnets 32, thereby freeing the HSA 40 from the latch 70. The read/write head 41 is then moved to a target position over the disk 11 to record data on the disk 11 or reproduce data from the disk 11.

As described above, according to the present invention, the retractor is installed on the pivot holder that is hardly affected by warpage of the bobbin and the levelness of the base. Therefore, the retract force that is generated by the retractor remains substantially the same as the value specified during the design of the HDD. As a result, the read/write head is not only prevented from being prematurely released from its parked state, but is also assuredly moved to a target position when a read/write operation of the drive is initiated.

Also, the retractor may be configured and employed as a bobbin pin, thereby saving manufacturing costs. Furthermore, the magnets can be elongated in a direction towards the retractor without affecting the data zone of the disk. Therefore, a larger amount of electromagnetic force can be generated by the VCM, compared to the prior art.

Finally, although the present invention has been shown and described with respect to the preferred embodiments thereof, the present invention is not limited to these embodiments. Instead, it would be appreciated by those skilled in the art that changes may be made to these embodiments without departing from the principles and spirit of the invention, the scope of which is defined by the claims.

What is claimed is:

1. A hard disk drive comprising:
   a base;

a pivot fixed to the base and having a central axis;

an actuator arm, and a read/write head supported by the actuator arm at one end of the actuator arm;

a pivot holder mounted to the pivot so as to be rotatable about the axis of the pivot, the actuator arm extending from one side of the pivot holder so as to rotate with the pivot holder;

a bobbin extending from a side of the pivot holder opposite the side from which the actuator arm extends;

a voice coil motor including a voice coil extending along the bobbin, and a magnet fixed to the base and juxtaposed with the voice coil, wherein the voice coil motor generates an electromagnetic force to rotate the actuator arm about the axis of the pivot when current flows in the voice coil; and a magnetic retractor situated at and integrated with the pivot holder, wherein a magnetic force is generated between the retractor and the magnet of the voice coil motor.

2. The hard disk drive of claim 1, wherein the retractor is of a magnetic material.

3. The hard disk drive of claim 2, wherein the retractor is of steel or stainless steel (SUS).

4. The hard disk drive of claim 1, further comprising a flexible printed circuit board (FPCB) extending atop the base, and wherein the retractor electrically connects the FPCB to the voice coil so as to serve as a bobbin pin.

5. The hard disk drive of claim 1, further comprising a flexible printed circuit board (FPCB) extending atop the base, a bobbin pin situated at and integrated with the pivot holder and electrically connecting the voice coil and the flexible printed circuit board (FPCB), the retractor being disposed adjacent to the bobbin pin on the pivot holder.

6. The hard disk drive of claim 1, further comprising a ramp mounted to the base, the ramp supporting the actuator arm at said one end of the actuator arm when the hard disk drive is a non-operating state in which the read/write head is parked.

7. The hard disk drive of claim 1, further comprising a latch mounted to the base, the latch facing the bobbin and cooperating with the bobbin to restrict rotation of the actuator arm when the hard disk drive is a non-operating state in which the read/write head is parked.

8. The hard disk drive of claim 7, further comprising a ramp mounted to the base, the ramp supporting the actuator arm at said one end of the actuator arm when the hard disk drive is in the non-operating state in which the read/write head is parked.

9. The hard disk drive of claim 7, wherein the latch comprises a latch arm mounted to the base so as to be rotatable about an axis, the latch arm having a hook at a thereof, and a magnetic latch pin situated at and integrated with the latch arm at a rear end of the latch arm such that a magnetic force is generated between the latch pin and the magnet of the voice coil.

10. A hard disk drive comprising:
a base;
a spindle motor mounted to the base;
a disk mounted to the spindle motor so as to be rotated by the spindle motor;
a pivot fixed to the base and having a central axis;
an actuator arm, and a read/write head supported by the actuator arm at one end of the actuator arm;
a pivot holder mounted to the pivot so as to be rotatable about the axis of the pivot, the actuator arm extending from one side of the pivot holder so as to rotate with the pivot holder;
a bobbin extending from a side of the pivot holder opposite the side from which the actuator arm extends;
a voice coil motor including a voice coil extending along the bobbin, and a magnet fixed to the base and juxtaposed with the voice coil, wherein the voice coil motor generates an electromagnetic force to rotate the actuator arm about the axis of the pivot when current flows in the voice coil; and
a magnetic retractor situated at and integrated with the pivot holder, whereby a magnetic force is generated between the retractor and the magnet of the voice coil motor, and wherein the retractor is disposed at a side of the pivot holder remote from the disk with respect to a line passing through the read/write head and the axis of the pivot.

11. The hard disk drive of claim 10, wherein the retractor is of a magnetic material.

12. The hard disk drive of claim 11, wherein the retractor is of steel or stainless steel (SUS).

13. The hard disk drive of claim 11, further comprising a flexible printed circuit board (FPCB) extending atop the base, and wherein the retractor electrically connects the FPCB to the voice coil so as to serve as a bobbin pin.

14. The hard disk drive of claim 11, further comprising a flexible printed circuit board (FPCB) extending atop the base, a bobbin pin situated at and integrated with the pivot holder and electrically connecting the voice coil and the flexible printed circuit board (FPCB), the retractor being disposed adjacent to the bobbin pin on the pivot holder.

15. The hard disk drive of claim 11, further comprising a ramp mounted to the base and disposed radially outwardly of the disk, the ramp supporting the actuator arm at said one end of the actuator arm when the hard disk drive is a non-operating state such that the read/write head is parked.

16. The hard disk drive of claim 11, further comprising a latch mounted to the base, the latch facing the bobbin and cooperating with the bobbin to restrict rotation of the actuator arm when the hard disk drive is a non-operating state in which the read/write head is parked.

17. The hard disk drive of claim 16, further comprising a ramp mounted to the base and disposed radially outwardly of the disk, the ramp supporting the actuator arm at said one end of the actuator arm when the hard disk drive is the non-operating state in which the read/write head is parked.

18. The hard disk drive of claim 16, wherein the latch comprises a latch arm mounted to the base so as to be rotatable about an axis, the latch arm having a hook at a thereof, and a magnetic latch pin situated at and integrated with the latch arm at a rear end of the latch arm such that a magnetic force is generated between the latch pin and the magnet of the voice coil.

* * * * *